United States Patent
Bornea et al.

(10) Patent No.: US 9,323,825 B2
(45) Date of Patent: Apr. 26, 2016

(54) METHOD AND APPARATUS FOR STORING SPARSE GRAPH DATA AS MULTI-DIMENSIONAL CLUSTER

(71) Applicant: International Business Machines Corporation, Armonk, NY (US)

(72) Inventors: Mihaela Ancuta Bornea, White Plains, NY (US); Julian Timothy Dolby, Bronx, NY (US); Achille Belly Fokoue-Nkoutche, White Plains, NY (US); Anastasios Kementsietsidis, New York, NY (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/967,261

(22) Filed: Aug. 14, 2013

(65) Prior Publication Data
US 2015/0052134 A1    Feb. 19, 2015

(51) Int. Cl.
*G06F 17/30* (2006.01)

(52) U.S. Cl.
CPC .... *G06F 17/30598* (2013.01); *G06F 17/30312* (2013.01); *G06F 17/30424* (2013.01)

(58) Field of Classification Search
CPC ............... G06F 17/30598; G06F 17/30312
USPC .............................................. 707/737
See application file for complete search history.

(56) References Cited

U.S. PATENT DOCUMENTS

| | | | |
|---|---|---|---|
| 5,918,225 A | 6/1999 | White et al. | |
| 6,546,395 B1 | 4/2003 | Dekimpe et al. | |
| 6,763,357 B1 | 7/2004 | Deshpande et al. | |
| 7,516,117 B2 | 4/2009 | Bhattacharjee et al. | |
| 7,765,211 B2 | 7/2010 | Bhattacharjee et al. | |
| 2013/0282765 A1* | 10/2013 | Bhattacharjee et al. | 707/803 |

OTHER PUBLICATIONS

Gopalkrishnan et al., "Star/Snow-flake Schema Driven Object-Relational Data Warehouse Design and Query Processing Strategies", DataWarehousing and Knowledge Discovery, Springer Berlin Heidelberg, 1999, 11-22.
Levene et al., "Why is the Snowflake Schema a Good Data Warehouse Design?" Information Systems 28.3 (2003) 225-240.
Padmanabhan et al., "Multi•Dimensional Clustering: A New Data Layout Scheme in DB2," SIGMOD 2003, Jun. 9-12, 2003, San Diego, CA.
Stefanovic et al., "Object-Based Selective Materialization for Efficient Implementation of Spatial Data Cubes" IEEE Transactions on Knowledge and Data Engineering, vol. 12, No. 6, Nov./Dec. 2000.
Zilio et al., "DB2 Design Advisor: Integrated Automatic Physical Database Design," Proceedings of the 30th VLDB Conference, Toronto, Canada, 2004.

* cited by examiner

*Primary Examiner* — Etienne Leroux
*Assistant Examiner* — Cindy Nguyen
(74) *Attorney, Agent, or Firm* — George Willinghan

(57) ABSTRACT

A system for storing graph data as a multi-dimensional cluster having a database with a graph dataset containing data and relationships between data pairs and a schema list of storage methods that use a table with columns and rows associated with data or relationships. An analyzer module to collect statistics of a graph dataset and a dimension identification module to identify a plurality of dimensions that each represent a column in the table. A schema creation and loading module creates a modified storage method and having a plurality of distinct table blocks and a plurality of table block indexes, one index for each table block and arranges the data and relationships in the given graph dataset in accordance with the modified storage method to create the multi-dimensional cluster.

20 Claims, 2 Drawing Sheets

METHOD AND APPARATUS FOR STORING SPARSE GRAPH DATA AS MULTI-DIMENSIONAL CLUSTER

FIELD OF THE INVENTION

The present invention relates to graph dataset storage and querying.

BACKGROUND OF THE INVENTION

Relational database systems have been used to store new types of data, like resource description framework (RDF) graphs of JavaScript Object Notation (JSON) documents. One of the key characteristics of these new data types is that they are fairly loosely structured and quite heterogeneous. Unlike relational data that all fit nicely into a pre-determined set of tables, these new data types have schemas that are not known a priori but change and evolve as time passes. There have been many relational representations developed that try to accommodate these new data types and deal with the dynamicity of schemas. For example, triple store relations have been developed for RDF data that store all triples into a single relation, and entity-types stores have been developed for the same purpose.

A key consideration when evaluating a relational representation for these new data types is performance during query evaluation. Existing representations have varying levels of success in achieving good performance across various query workloads. The most obvious and straight-forward way to attempt to improve the performance of problematic queries has been the creation of additional indexes over the underlying tables. Unfortunately, while the creation of indexes is a full-proof approach to improve the performance of queries over relational data, their success is questionable when these are created over the representations of unstructured data. Inherently, indexes work well in relational data since given a column all the indexed data in the column are of the same type.

Unfortunately, while representing these new data types in relational databases, it is seldom the case that a column stores data that are similar. More often than not, columns are overloaded to save space and simplify the schema design with multiple data types. Indexes then fail to efficiently speed-up queries since data retrieved and indexed in a particular column are often irrelevant to the query at hand. The situation is even worse when one considers that the most effective indexes in relational databases, and the ones that offer the most performance gains, are those in which the index key is unique for each record and the data on disk are clustered according to the indexed value. However, the new data types do not satisfy any of these requirements. The indexed values are seldom unique, and it is impossible to decide a single preferred clustering strategy for the index data. This is a result of the fact that the data can be accessed in a multitude of ways given the plurality of predicates available and the heterogeneity of data elements having these predicates. Therefore, indexing techniques are desired that can be used with the new types of data currently stored in relational stores to improve query performance.

SUMMARY OF THE INVENTION

Exemplary embodiments of systems and methods in accordance with the present invention identify the portions of the sparse graph dataset that can be treated as dimensions of a multi-dimensional cube and use appropriate index structures that have been developed in the context of data warehousing to index those data. As columns are used to store predicates and values, common statistics are gathered for the various columns as well as information regarding how the columns are used. This includes identifying whether the columns store predicates, which predicates the columns store, how many values does each predicate have and whether the predicates are single-valued or multi-valued, among other information. Of particular interest are columns that are overloaded with multi-predicates. In general, overloading results from storing multiple heterogeneous data in a single relational column.

These multiple predicates act as values of a dimension, where the dimension itself corresponds to the column the predicates are stored. Exemplary embodiments of systems and methods in accordance with the present invention, reviews the gathered statistics and collects all the appropriate columns and dimensions. This information is used to create or redefine a statement, for example referred to as the "Create Table" statement, that includes the columns that are appropriate dimensions. These new create table statements incorporate a organization clause that includes a list containing the dimensions. This use of the organization clause yields two consequences. First, the redefined table statement results in a new organization of the data on disk, so that the relation is organized in a plurality of logical blocks, one per dimension. Second, new special block indexes are created automatically by the database management system (DBMS) for each of the blocks and dimensions.

The same process is used for columns storing values corresponding to subjects or objects. At the end of the process, a new table organization and indexes are available to the DBMS. Unlike common index structures that confuse and mix data stored in the same column, the new block indexes keep the different aspects of the sparse data, e.g. predicates, separate from each other. Unlike existing indexes that require that the data on disk are clustered along only a single index, the new block indexes are able to cluster each block of data independently of the other blocks, resulting in a multi-dimensional clustering of the data. The combination of multiple clusters and block indexes results in an immediate improvement in query evaluation times.

DETAILED DESCRIPTION

Exemplary embodiments in accordance with the present invention provide for the organization of graph datasets such as resource description framework (RDF) datasets that are used, for example, in the Semantic Web in order to improve the processing of queries over these graph datasets. Improvements in the processing of queries minimize the time required to process these queries and optimize the use of resources, i.e., computing and network resources, in processing these queries. The organization, i.e., storing or shredding, of the graph data is structured in accordance with statistics describing the content, i.e., values of subjects, predicates (properties) and objects, and organization of the RDF datasets in order to improve the processing of queries over the RDF datasets. In particular, the content of the graph dataset, i.e., the data or data values and relationships, are stored in multiple distinct schemas for a single RDF dataset or into a plurality of distinct dimensions, i.e., blocks of tuples, based on a column within the dataset that is associated with a data or relationships, e.g., objects, subjects or predicates in the case of RDF datasets.

Figure 1:
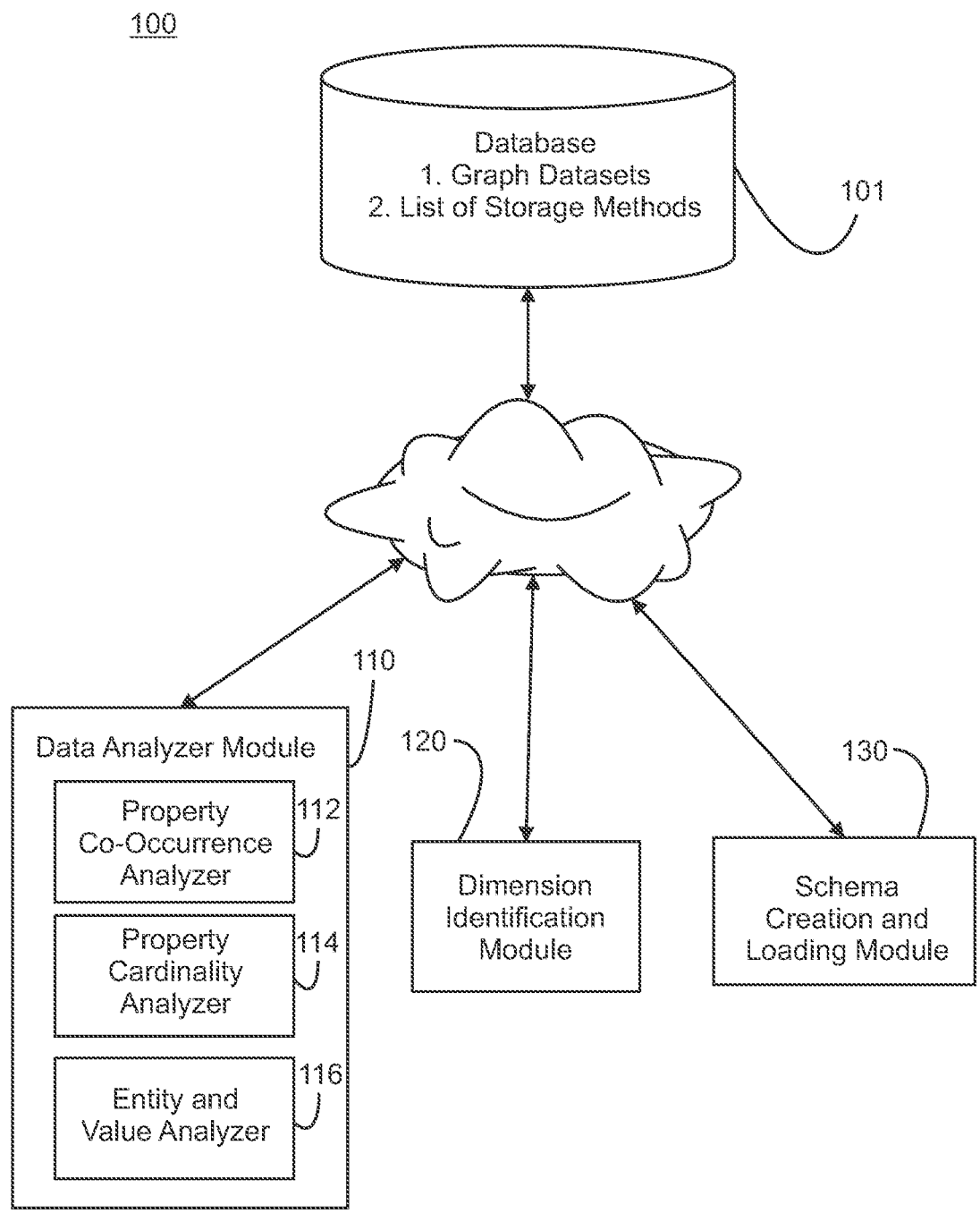
FIG. 1 is a schematic illustration of an embodiment of a system for storing graph data as a multi-dimensional cluster in accordance with the present invention.

Referring initially to FIG. 1, an exemplary embodiment of a system for use in storing graph data as a multi-dimensional cluster 100 is illustrated. This system includes one or more databases 101. Suitable databases are known and available in the art and can be disposed in one or more computing systems including distributed computing systems. Stored on the database is at least one a graph dataset. These graphs datasets include RDF datasets that are used, for example, in the Semantic Web. RDF datasets in particular and graph datasets in general include data arranged in a plurality of nodes and relationships between data pairs illustrated as a plurality of edges between pairs of nodes. These arrangements of nodes and relationships form the "graph" or structure of the graph datasets. In RDF datasets, the nodes represent subjects and objects and the relationships are the predicates or properties that connect subjects to objects. Any arrangement of the content of the subject and object nodes and predicates in a given RDF graph as known to and understood by one of skill in the art can be used in the graph datasets of the present invention. As the graph datasets contain a plurality of tuples or subject-predict-object triples, the content of a graph data set can also be represented in a column and row delineated structure. The present invention takes advantage of the various options for representing the data and relationships in each graph dataset. In general, each graph dataset includes data and relationships between data pairs. The data and relationships can also be arranged in table format, for example in a table format having a plurality of rows and a plurality of columns.

Therefore, that database also includes a schema list that contains a plurality of storage methods for the data and relationship tuples of a given graph dataset. Each storage method is a distinct structural arrangement of the data and relationships from the graph data set. In one embodiment, the schema list includes a plurality of storage methods, and each one of these storage methods is a table with s plurality of columns and a plurality of rows. A given column or a given row is associated with data or relationships Suitable storage methods include, but are not limited to, a triple-store storage method, a property cluster storage method, a property class storage method, a vertically partitioned column storage method and an entity oriented storage method. In the triple-store, the data and relationships are arranged in triples, each triple occupying a row in a table having three columns. In the property cluster storage method binary data groupings, i.e., subjects and objects, are clustered in a table. The property class storage method breaks the table into a plurality of tables by property class. The vertically partitioned column storage method has a separate two column (binary) for each unique property of relationship. A different row is provided for each subject. In the entity oriented storage method, a plurality binary relationship and data value groupings are associated with a given data value row in a table. For RDF, a given subject has a row and a plurality of predicate and object binary groupings in the row.

The system includes a data analyzer module 110 executing on a computing system. This module, as well as all other modules and databases are in communication with each other across one or more local or wide are networks. The modules and databases can also be contained in a distributed computing system, a single domain, across multiple domains or within a single computing system, computer or server. The data analyzer module collects statistics for a given graph dataset arranged in accordance with one of the plurality of storage methods. These statistics, e.g., content and organization, of the graph datasets include an identification of the content of each individual cell in the table, an identification of whether a given column is associated with data or relationships, an identification of all relationships contained in each column associated with relationships, an identification of all data values associated with all relationships contains in each column associated with relationships and an identification of each relationship contains in each column associated with relationships as either a single-valued relationship or a multi-valued relationship. In general, the data values represent the content of individual cells in a given column. The structure among the data and relationships is also determined. In order to perform these functions, the data analyzer module includes a relationship co-occurrence analyzer 112, a relationship cardinality analyzer 114 and an entity and data value analyzer 116.

The system includes a dimension identification module 120 that is executing on the computing system and that receives the collected statistics from the data analyzer module. The dimension identification module uses the collected statistics to identify a plurality of dimensions in the graph dataset. Each dimension is a column in the table, and preferably a column associated with relationships, i.e., predicates or properties. In one embodiment, the dimension identification modules can also use these collected statistics to calculate metrics describing the data and relationships in the graph dataset. Suitable metrics include, but are not limited to, co-occurences of relationships linking data associated with a given entity, co-occurences of relationships linking data of a given type, selectivity of a given relationship, number of distinct data values associated with a given relationship, an identification of single-valued relationships and multi-valued relationships and selectiveness of given data values by relationship.

The system includes a schema creation and loading module 130 that is executing on the computing system. The schema creation and loading module creates a modified storage method. This modified storage method contains a plurality of distinct table blocks, one block for each dimension in a group of dimensions selected from the plurality of dimensions. In one embodiment, one or more data values and one or more relationships are contained in more than one table blocks. In addition, the schema creation and loading module creates a plurality of table block indexes, one index for each table block. In one embodiment, each table block index includes an identification and location of all data and relationships in that table block. The schema creation and loading module arranges the data and relationships in the given graph dataset in accordance with the modified storage method to create the multi-dimensional cluster. This provides the desired improved multi-dimensional cluster storage schema of the present invention that is used to process queries over the graph dataset in faster and more efficiently.

This system is used in methods in accordance with the present invention to store graph data as multi-dimensional cluster. Initially, the storage method, i.e., type of table format, for an input graph dataset is determined and the input graph dataset is analyzed to generate statistics that describe the content of the rows and columns of the graph dataset table. Based on the identified statistics a plurality of dimensions are identified for the graph data set. Each dimension is a column in the table and is associated with either data or relationships in the graph dataset. Preferably the dimensions are related to relationships, i.e., predicates, in the graph dataset. The individual cells in a given column are the values for the associated dimension, e.g., the predicate values. A separate block table is created for each dimension along with a block table index for each block table. Therefore, the graph dataset table is broken into a plurality of smaller blocks based on a plurality of dimensions, preferably relationship dimensions. The graph dataset is then rearranged into these block tables, and the block tables and associated indexes are used to process queries over the graph dataset.

Figure 2:
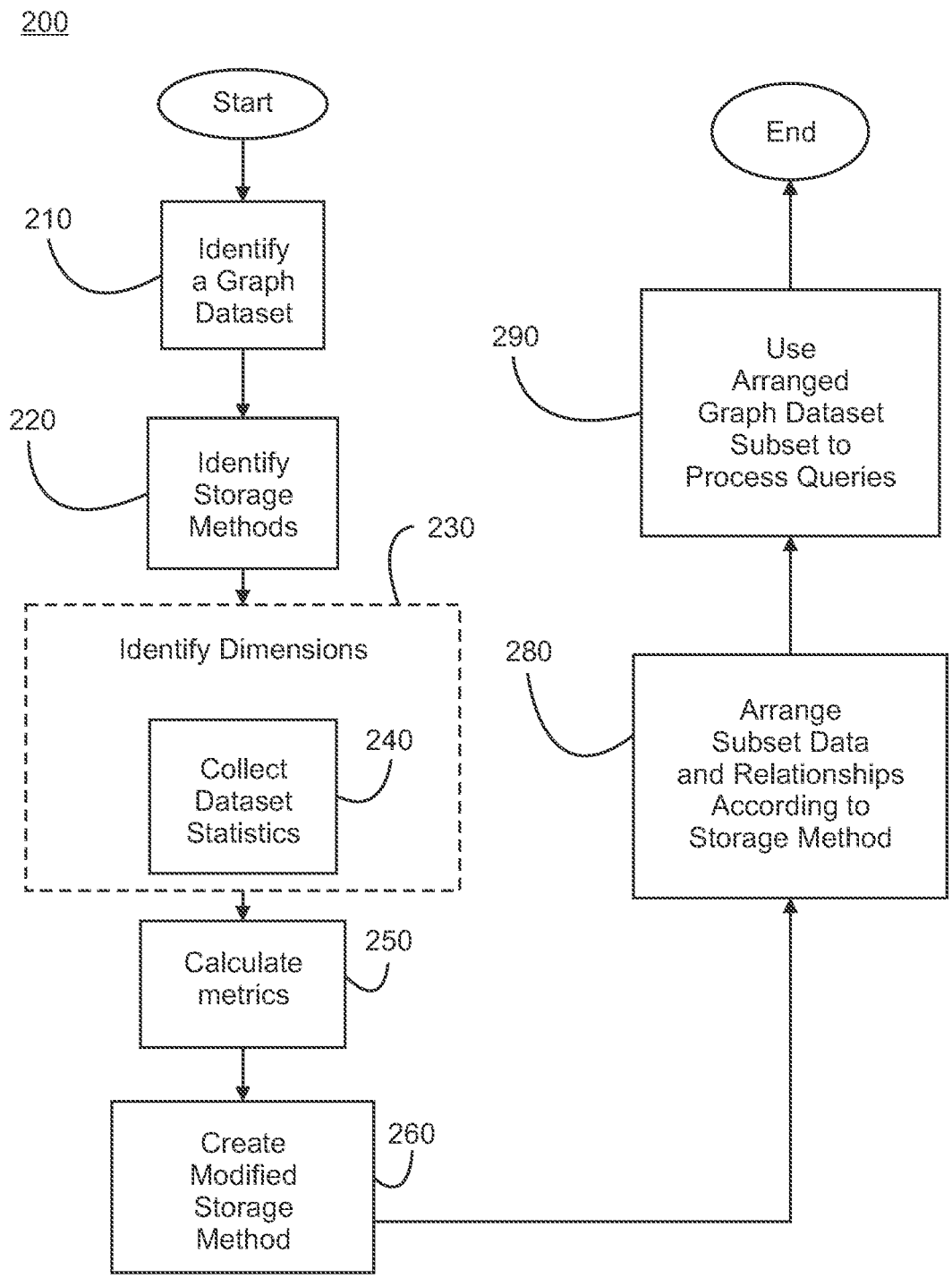
FIG. 2 is a flow chart illustrating an embodiment of a method for storing graph data as a multi-dimensional cluster in accordance with the present invention.

Referring to FIG. 2, the exemplary embodiments in accordance with the present invention are also directed to a method for storing graph data as a multi-dimensional cluster 200. Initially, a graph dataset is identified 210. This graph dataset includes data and relationships between data pairs. Preferably, the graph dataset is a resource description framework (RDF) dataset that contains a plurality of subjects and a plurality of objects that contains the graph dataset data. In addition, the RDF dataset includes a plurality of predicates that correspond to the graph dataset relationships and that express relationships between subject and object pairs. In addition, at least one storage method for the graph dataset is identified 220. Each storage method is a table with a plurality of columns and a plurality of rows. Each column and each row is associated with data or relationships. Suitable storage methods include, but are not limited to, a triple-store storage method, a property cluster storage method, a property class storage method, a vertically partitioned column storage method or an entity oriented storage method.

For a given graph dataset arranged in accordance with a given storage method, i.e., a given table arrangement, a plurality of dimensions are identified 230. Each dimension is a column in the graph dataset table. In one embodiment, identifying the plurality of dimensions includes collecting statistics for the graph dataset 240. Suitable statistics include, but are not limited to, an identification of the content of each individual cell in the table, an identification of whether a given column is associated with data or relationships, an identification of all relationships contained in each column associated with relationships, an identification of all data values associated with all relationships contains in each column associated with relationships and an identification of each relationship contains in each column associated with relationships as either a single-valued relationship or a multi-valued relationship. If desired, the collected statistics are used to calculate metrics 250 describing the data and relationships in the graph dataset. Suitable metrics include, but are not limited to co-occurences of relationships linking data associated with a given entity, co-occurences of relationships linking data of a given type, selectivity of a given relationship, number of distinct data values associated with a given relationship, an identification of single-valued relationships and multi-valued relationships and selectiveness of given data values by relationship. The data values represent the content of individual cells in a given column, e.g., predicate values, literals, blank cells and uniform resource identifiers. The collected statistics are used to identify the plurality of dimensions.

The collected statistics, and if calculated the metrics are used to create a modified storage method 260. The modified storage method includes a plurality of distinct table blocks. The plurality of distinct table blocks includes one block for each dimension in a group of dimensions selected from the plurality of dimensions. In one embodiment, the group of dimensions includes all dimensions from the plurality of dimensions. In another embodiment, the group of dimensions includes only dimensions from a column associated with relationships, i.e., predicates. The table blocks can be non-overlapping and mutually exclusive, or one or more data values and one or more relationships are contained in more than one table blocks. A plurality of table block indexes are created, one index for each table block. Therefore, each graph dataset table block in the modified storage method has its own index. Each table block index contains an identification and location of all data and relationships in that table block.

The data and relationships from the graph dataset are arranged 280 in accordance with the modified storage method to create the multi-dimensional cluster. The graph dataset arranged in accordance with the modified storage method is used to process queries over the graph dataset 290. This process can be repeated for additional graph datasets and alternative storage methods. In addition, a plurality of graph datasets stored in accordance with a plurality of storage methods can be processed into a plurality of different modified storage methods in parallel.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof In one embodiment, the present invention is directed to a machine-readable or computer-readable medium containing a machine-executable or computer-executable code that when read by a machine or computer causes the machine or computer to perform a method for storing graph data as a multi-dimensional cluster in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for storing graph data as a multi-dimensional cluster, the method comprising:
   identifying a graph dataset stored in a database comprising data and relationships between data pairs;
   identifying a storage method for the graph dataset, the storage method comprising a table comprising a plurality of columns and a plurality of rows, each column and each row associated with data or relationships;
   identifying a plurality of dimensions, each dimension comprising a column in the table;
   creating a modified storage method, the modified storage method comprising a plurality of distinct table blocks, one block for each dimension in a group of dimensions selected from the plurality of dimensions;
   creating a plurality of table block indexes, one index for each table block; and
   arranging the data and relationships from the graph dataset in accordance with the modified storage method to create the multi-dimensional cluster for storage in the database.

2. The method of claim 1, wherein the graph dataset comprises a resource description framework dataset comprising:
   a plurality of subjects and a plurality of objects comprising the graph dataset data; and
   a plurality of predicates comprising the graph dataset relationships and expressing relationships between subject and object pairs.

3. The method of claim 1, wherein the storage method comprises a triple-store storage method, a property cluster storage method, a property class storage method, a vertically partitioned column storage method or an entity oriented storage method.

4. The method of claim 1, wherein identifying the plurality of dimensions further comprises:
   collecting statistics for the graph dataset, the statistics comprising an identification of the content of each individual cell in the table, an identification of whether a given column is associated with data or relationships, an identification of all relationships contained in each column associated with relationships, an identification of all data values associated with all relationships contains in each column associated with relationships and an identification of each relationship contains in each column associated with relationships as either a single-valued relationship or a multi-valued relationship; and
   using the collected statistics to identify the plurality of dimensions;
   wherein the data values comprise content of individual cells in a given column.

5. The method of claim 1, wherein the group of dimensions comprises all dimensions from the plurality of dimensions.

6. The method claim 1, wherein the group of dimensions comprises only dimensions comprising a column associated with relationships.

7. The method of claim 1, wherein one or more data values and one or more relationships are contained in more than one table blocks.

8. The method of claim 1, wherein each table block index comprises an identification and location of all data and relationships in that table block.

9. The method of claim 1, further comprising using the graph dataset arranged in accordance with the modified storage method to process queries over the graph dataset.

10. A non-transitory computer-readable storage medium containing a computer-readable code that when read by a computer causes the computer to perform a method for storing graph data as a multi-dimensional cluster, the method comprising:
    identifying a graph dataset comprising data and relationships between data pairs;
    identifying a storage method for the graph dataset, the storage method comprising a table comprising a plurality of columns and a plurality of rows, each column and each row associated with data or relationships;
    identifying a plurality of dimensions, each dimension comprising a column in the table;
    creating a modified storage method, the modified storage method comprising a plurality of distinct table blocks, one block for each dimension in a group of dimensions selected from the plurality of dimensions;
    creating a plurality of table block indexes, one index for each table block; and
    arranging the data and relationships from the graph dataset in accordance with the modified storage method to create the multi-dimensional cluster.

11. The non-transitory computer-readable medium of claim 10, wherein the graph dataset comprises a resource description framework dataset comprising:
    a plurality of subjects and a plurality of objects comprising the graph dataset data; and
    a plurality of predicates comprising the graph dataset relationships and expressing relationships between subject and object pairs.

12. The non-transitory computer-readable medium of claim 10, wherein the storage method comprises a triple-store storage method, a property cluster storage method, a property class storage method, a vertically partitioned column storage method or an entity oriented storage method.

13. The non-transitory computer-readable medium of claim 10, wherein identifying the plurality of dimensions further comprises:
    collecting statistics for the graph dataset, the statistics comprising an identification of the content of each individual cell in the table, an identification of whether a given column is associated with data or relationships, an identification of all relationships contained in each column associated with relationships, an identification of all data values associated with all relationships contains in each column associated with relationships and an identification of each relationship contains in each column associated with relationships as either a single-valued relationship or a multi-valued relationship; and
    using the collected statistics to identify the plurality of dimensions;
    wherein the data values comprise content of individual cells in a given column.

14. The non-transitory computer-readable medium of claim 10, wherein the group of dimensions comprises all dimensions from the plurality of dimensions.

15. The non-transitory computer-readable medium of claim 10, wherein the group of dimensions comprises only dimensions comprising a column associated with relationships.

16. The non-transitory computer-readable medium of claim 10, wherein one or more data values and one or more relationships are contained in more than one table blocks.

17. The non-transitory computer-readable medium of claim 10, wherein each table block index comprises an identification and location of all data and relationships in that table block.

18. The non-transitory computer-readable medium of claim 10, further comprising using the graph dataset arranged in accordance with the modified storage method to process queries over the graph dataset.

19. A system for storing graph data as a multi-dimensional cluster, the system comprising:
- a database comprising:
  - at least one graph dataset, each graph dataset comprising data and relationships between data pairs; and
  - a schema list comprising a plurality of storage methods, each storage method comprising a table comprising a plurality of columns and a plurality of rows, each column and each row associated with data or relationships;
- an analyzer module executed by a processor on a computing system and in communication with the database, the data analyzer module configured to collect statistics for a given graph dataset arranged in accordance with one of the plurality of storage methods, the statistics comprising an identification of the content of each individual cell in the table, an identification of whether a given column is associated with data or relationships, an identification of all relationships contained in each column associated with relationships, an identification of all data values associated with all relationships contains in each column associated with relationships and an identification of each relationship contains in each column associated with relationships as either a single-valued relationship or a multi-valued relationship, the data values comprising content of individual cells in a given column;
- a dimension identification module executing on the computing system, in communication with the database and configured to identify a plurality of dimensions, each dimension comprising a column in the table; and
- a schema creation and loading module executing on the computing system and configured to:
  - create a modified storage method, the modified storage method comprising a plurality of distinct table blocks, one block for each dimension in a group of dimensions selected from the plurality of dimensions;
  - create a plurality of table block indexes, one index for each table block; and
  - arrange the data and relationships in the given graph dataset in accordance with the modified storage method to create the multi-dimensional cluster.

20. The system of claim 19, wherein the analyzer module comprises a relationship co-occurrence analyzer, a relationship cardinality analyzer and an entity and data value analyzer.

* * * * *